(12) United States Patent
Griess et al.

(10) Patent No.: US 7,954,760 B2
(45) Date of Patent: Jun. 7, 2011

(54) CARGO FLOOR, SYSTEM, AND METHOD

(75) Inventors: Kenneth H. Griess, Kent, WA (US); Gary E. Georgeson, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 357 days.

(21) Appl. No.: 11/761,193

(22) Filed: Jun. 11, 2007

(65) Prior Publication Data

US 2008/0302913 A1    Dec. 11, 2008

(51) Int. Cl.
*B64C 1/20* (2006.01)
(52) U.S. Cl. .................................................. 244/118.1
(58) Field of Classification Search ............... 244/118.1, 244/119, 118.2, 118.5, 137.1; 414/529, 532
See application file for complete search history.

(56) References Cited

U.S. PATENT DOCUMENTS

| | | | |
|---|---|---|---|
| 3,463,334 A * | 8/1969 | Blakely et al. | 244/137.1 |
| 3,612,316 A * | 10/1971 | Baldwin et al. | 414/499 |
| 4,674,712 A * | 6/1987 | Whitener et al. | 244/119 |
| 5,014,935 A * | 5/1991 | Dalbera | 244/137.1 |
| 6,219,983 B1 * | 4/2001 | Gråkjaar Jensen et al. | 52/403.1 |
| 6,427,945 B1 | 8/2002 | Bansemir | |
| 6,517,028 B2 * | 2/2003 | Huber | 244/137.1 |
| 6,834,833 B2 | 12/2004 | Sankrithi | |
| 7,261,257 B2 * | 8/2007 | Helou, Jr. | 244/137.1 |
| 2001/0010345 A1 * | 8/2001 | Clifford | 244/119 |
| 2002/0005150 A1 | 1/2002 | Taylor et al. | |

\* cited by examiner

*Primary Examiner* — Tien Dinh

(57) ABSTRACT

Embodiments provide a cargo floor, a system, and a method adapted to be made integral with or complementary of the aircraft fuselage. Cargo floor members may be adapted to be coupled with a flat fuselage bottom inner skin of an aircraft fuselage to serve as the main orthotropic stiffeners to the flat fuselage bottom inner skin such that a portion of the in service loading experienced by the aircraft are shared by a combination of the fuselage and the cargo floor.

16 Claims, 4 Drawing Sheets

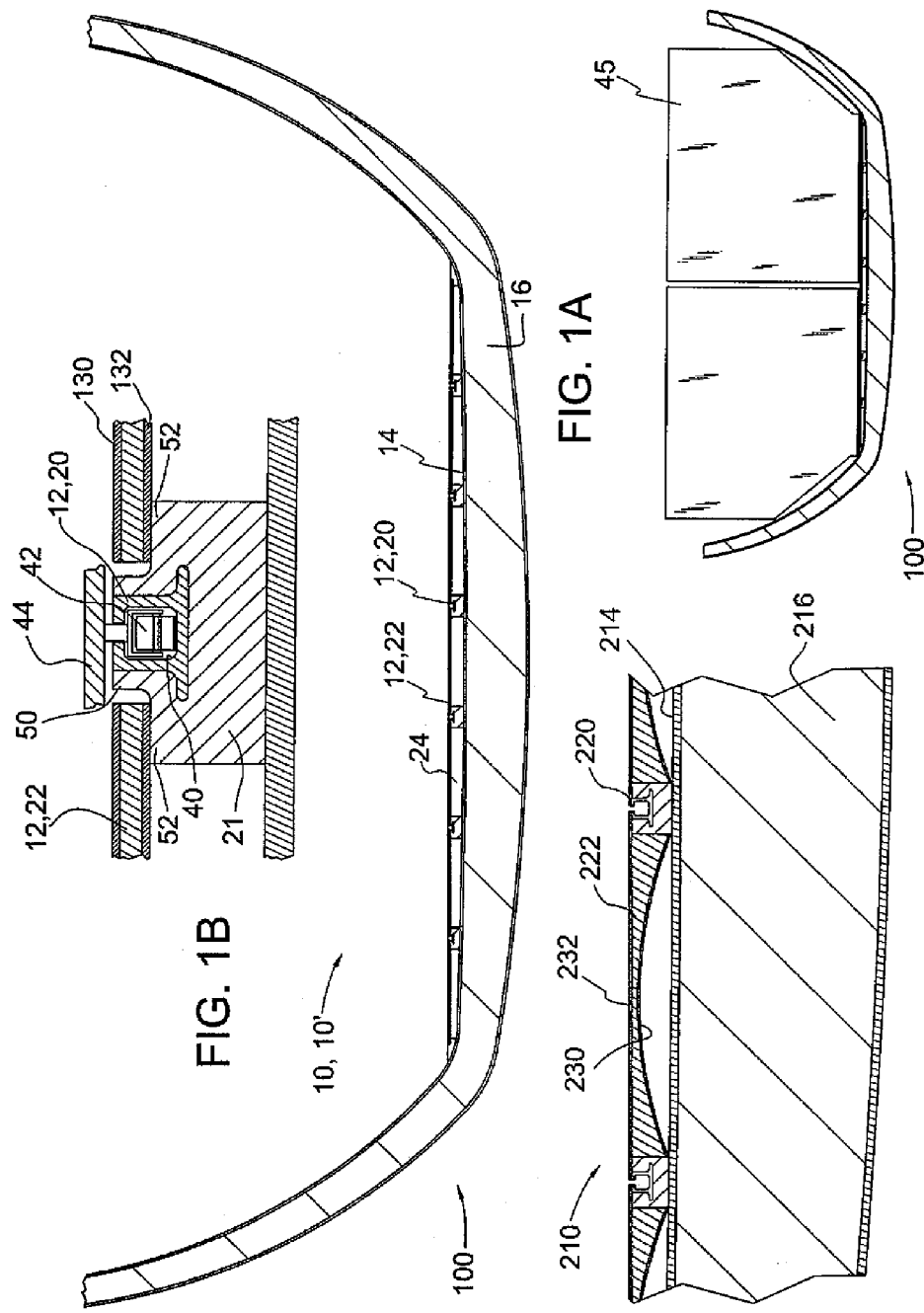

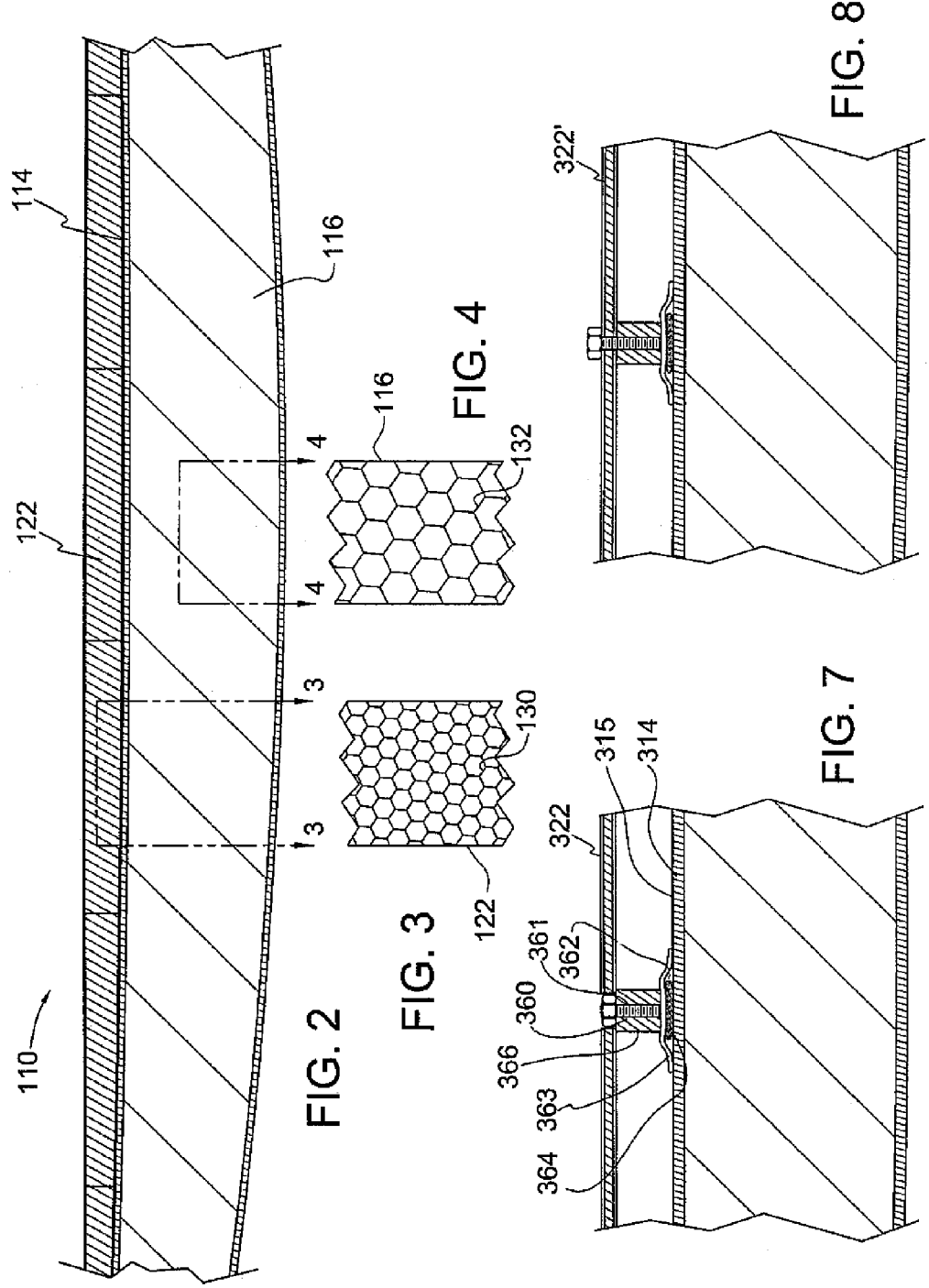

CARGO FLOOR, SYSTEM, AND METHOD

TECHNICAL FIELD

Embodiments relate to the field of aircraft cargo floors, and, more specifically, to a cargo floor, a system and a method adapted to be made integral with or complementary of an aircraft fuselage.

BACKGROUND

A large aircraft fuselage is structurally designed to endure the effects of vehicle maneuvers in the air and on the ground. The altitude of vehicle flight requires that internal fuselage pressure be maintained at levels comfortable to pilots and passengers. A fuselage which is to be pressurized is typically formed to have a generally circular cross-section to maximize strength.

Commercial pressurized aircraft are typically constructed using so-called Semi-monocoque, or semi-structural skin design. This construction includes a series of frames running transverse to a longitudinal axis of the fuselage. The frames are joined with lightweight longitudinal elements called stringers. The stringers are covered with a skin of sheet aluminum.

Cargo floors in such aircraft are typically supported in a flat configuration up from the curved belly of the aircraft with struts and other framing members. These cargo floor framing members may provide little to no structural strength to the fuselage of the aircraft and add weight.

SUMMARY

Various embodiments may provide an aircraft cargo floor that may include one or more cargo floor members having one or more features to facilitate coupling of the one or more cargo floor members with a flat fuselage bottom inner skin of an aircraft fuselage. The coupling may enable the one or more cargo floor members to serve as one or more orthotropic stiffeners to the flat fuselage bottom inner skin of the aircraft fuselage such that a portion of in service loading experienced by the aircraft is shared by a combination of the aircraft fuselage and the aircraft cargo floor.

The aircraft fuselage may have a first structural strength when uncoupled with the aircraft cargo floor. The aircraft fuselage, when coupled with the cargo floor, may have a second structural strength. The second structural strength may be greater than the first structural strength. Various embodiments may provide cost savings and efficiencies.

Various embodiments may use sandwich, or core construction techniques with non-fatigue sensitive material, for example, composites. Core construction may provide greater structural efficiency and may enable noncircular cross-section aircraft. The one or more cargo floor members may be one or more core structural panels. The one or more cargo floor members may include two or more longitudinal members disposed on and substantially longitudinal with the flat fuselage bottom inner skin. The aircraft cargo floor may further comprise structural floor panels supported by the longitudinal members. The longitudinal members may include a channel disposed therein to receive a roller to facilitate movement of a unit load device along the fuselage upon coupling the roller with the channel. Various embodiments may also, or instead, include one or more floor panels having rollers coupled with a bottom thereof. The rollers may be coupled with the channels for adjustable and selective placement of the floor members within the fuselage.

Instead of, or in addition to, the longitudinal members, the aircraft cargo floor may further include a plurality of discrete support members to couple the one or more cargo floor members to the flat fuselage bottom inner skin, and to support the one or more cargo floor members.

Embodiments may include an aircraft having a fuselage having a substantially flat inner bottom, and a cargo floor coupled to the flat inner bottom to receive cargo. The cargo floor may increase structural strength of the fuselage. A pair of wings may be coupled to the fuselage. The fuselage may be adapted to be pressurized.

In various embodiments the aircraft may further comprise a plurality of discrete support members coupled to the substantially flat inner bottom to support the one or more floor panels. Each discrete support member may include a bottom hollow portion open to a top surface of the substantially flat inner bottom to provide a negative pressure to create a suction to couple the one or more floor panels to the substantially flat inner bottom. An adhesive may be placed inside at least one bottom hollow portion of a discrete support member to adhere the discrete support member to the substantially flat inner bottom.

Various embodiments may include an aircraft cargo system having two or more longitudinal members disposed on and substantially longitudinal with a substantially flat bottom of an aircraft fuselage, and flooring panels supported above the substantially flat bottom of the aircraft fuselage by the longitudinal members. At least one of the one or more longitudinal members may have a longitudinal channel to receive one or more rollers of a unit load device or one or more rollers coupled to the flooring panels. The longitudinal members may be embedded in a thermoplastic. The thermoplastic may be attached to the fuselage with a bonding agent.

At least one of the one or more longitudinal members may include a central raised portion. A channel may be located in the central raised portion and may be open to an interior of the aircraft fuselage to receive a securing member to secure cargo. A protruding flange may be disposed below and on opposite sides of the central raised portion to support the flooring panels.

Various embodiments may provide a method which may include: providing a pressurizable aircraft fuselage with a substantially flat inner bottom to raise the aircraft fuselage's structural strength; coupling longitudinal members with the substantially flat inner bottom; and further coupling structural floor panels to the longitudinal members.

The method may also include designing the fuselage to have a first level of structural strength when uncoupled with the floor panels, and designing the longitudinal members and the floor panels to raise the structural strength of the fuselage to a second level of structural strength upon coupling the longitudinal members and the floor panels with the fuselage.

Various embodiments may also provide a method of loading cargo into an aircraft fuselage which may include: placing cargo into and/or onto respective one or both of a unit load device and a flooring panel; fitting a roller coupled to a bottom of the unit load device or the flooring panel into a longitudinal channel of a longitudinal structural member of the aircraft fuselage; and rolling, via the roller, the cargo and the one or both of a unit load device and the flooring panel into and along the fuselage to a location in the fuselage to be secured for flight.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIG. 1A illustrates a cross-sectional view of a cargo floor disposed in an aircraft fuselage in accordance with various embodiments;

FIG. 1B illustrates a detailed cross-sectional view of a portion of the cargo floor members illustrated in FIG. 1A;

FIG. 2 illustrates a cross-sectional view of a cargo floor disposed in an aircraft fuselage in accordance with various other embodiments;

FIG. 3 illustrates a cross-sectional view a portion of a flooring panel taken at line 3-3 in FIG. 2;

FIG. 4 illustrates a cross-sectional view of a portion of a fuselage taken at line 4-4 in FIG. 2;

FIG. 5 illustrates a cross-sectional view of an aircraft fuselage and cargo floor system including cargo containers in accordance with various embodiments;

FIG. 6 illustrates a partial cross-sectional view of a cargo floor disposed in an aircraft fuselage in accordance with various other embodiments;

FIG. 7 illustrates a cross-sectional view of a portion of a cargo floor disposed in an aircraft fuselage, and in particular to a coupling arrangement, in accordance with various embodiments;

FIG. 8 illustrates a cross-sectional view of a portion of a cargo floor disposed in an aircraft fuselage, and in particular to another coupling arrangement, in accordance with various embodiments;

DETAILED DESCRIPTION OF VARIOUS EMBODIMENTS

Figure 9:
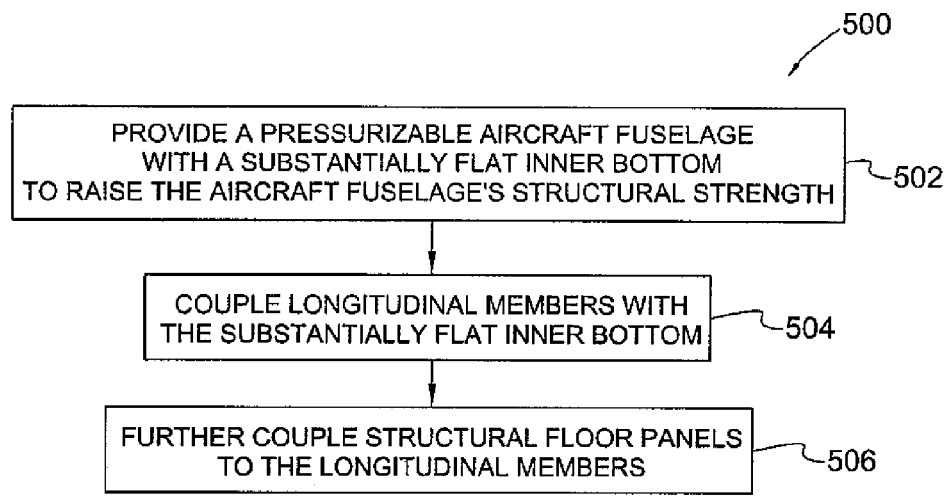
FIG. 9 is a flow diagram illustrating a method in accordance with various embodiments.

In the following detailed description, reference is made to the accompanying drawings which form a part hereof, and in which are shown by way of illustration embodiments which may be practiced. It is to be understood that other embodiments may be utilized and structural or logical changes may be made without departing from the scope of the disclosure. Therefore, the following detailed description is not to be taken in a limiting sense, and the scope of embodiments is defined by the appended claims and their equivalents.

Various operations may be described as multiple discrete operations in turn, in a manner that may be helpful in understanding the embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of the embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" means A or B. For the purposes of the description, a phrase in the form "A and/or B" means "(A), (B), or (A and B)." For the purposes of the description, a phrase in the form "at least one of A, B, and C" means "(A), (B), (C), (A and B), (A and C), (B and C), or (A, B and C)." For the purposes of the description, a phrase in the form "(A)B" means "(B) or (AB)," that is, A is an optional element.

The description may use the phrases "in an embodiment," or "in embodiments," which may each refer to one or more of the same or different embodiments. Furthermore, the terms "comprising," "including," "having," and the like, as used with respect to the embodiments, are synonymous.

FIG. 1A illustrates a partial cross-sectional view of an aircraft fuselage and its cargo floor and FIG. 1B illustrates a blown-up detailed view of a portion of the aircraft fuselage and the cargo floor illustrated in FIG. 1A in accordance with various embodiments. An aircraft cargo floor 10 may include one or more cargo floor members identified generally with reference designator 12 adapted to be coupled with a flat fuselage bottom inner skin 14 of an aircraft fuselage 16. The cargo floor members 12 may be, without limitation, bonded to or made integral with the fuselage bottom inner skin 14.

The cargo floor members 12 may have a number of distinct components, and various embodiments may include one or more of these components. The distinct components may include but may not be limited to longitudinal members identified specifically with reference designator 20, and flooring panels identified specifically with reference designator 22.

The illustrated embodiment may be an aircraft cargo system 10'. The system 10' may include two or more substantially longitudinal members 20 disposed on and longitudinal with the substantially flat bottom 14 of the aircraft fuselage 16. The longitudinal members 20 are illustrated in cross-section, and it will be understood that they may extend into and out of plane of the figures, normal thereto. The fuselage 16 may be similarly understood. Flooring panels 22 may be supported above the bottom of the aircraft fuselage 16 by the longitudinal members 20. In various embodiments there may be a gap 24 between the flooring panels 22 and the bottom 14 of the aircraft fuselage 16. Such a gap 24 may collect bilge, or debris, or the like. The gap 24 may be accessible by, for example, removing all or a portion of a flooring panel 22. The gap 24 may also be accessible from the outside of the aircraft fuselage 16.

The aircraft cargo floor 10 may be installed in an aircraft 100 (only a portion thereof is illustrated for simplicity). The aircraft fuselage 16 of the aircraft 100 may be adapted to be pressurized and may have a substantially flat inner bottom 14 to receive cargo. A pair of wings (not shown) may be coupled to the fuselage.

In various embodiments the aircraft fuselage 16 may have a first structural strength when uncoupled with the cargo floor or cargo floor system. For example, aircraft in accordance with various embodiments may be required by law or by specification to meet predetermined structural strength standards. Such embodiments may include an aircraft fuselage having a first structural strength. However, when the cargo floor, or system, according to these embodiments, and the aircraft fuselage are in combination they may have a second structural strength higher than the first structural strength. Embodiments may include a fuselage that is individually stronger than one or more standards, but may be combined with a cargo floor according to various embodiments to provide an added factor of safety.

Embodiments may provide one or more cargo floor members having one or more features to facilitate coupling of the one or more cargo floor members with a flat fuselage bottom inner skin of an aircraft fuselage to enable the one or more cargo floor members to serve as one or more stiffeners, for example, orthotropic stiffeners, to the flat fuselage bottom inner skin such that a portion of in service loading experienced by the aircraft is shared by a combination of the aircraft fuselage and the aircraft cargo floor.

FIG. 2 also illustrates a partial cross-sectional view of the aircraft fuselage and its cargo floor in accordance with various embodiments. In the illustrated embodiment, flooring panels 122 may be directly coupled with a flat fuselage bottom skin 114. For example, they may be made integral with and/or without limitation be bonded to a flat fuselage bottom inner skin 114 of an aircraft fuselage 116. The aircraft fuselage 116 alone may have a first level of strength when uncoupled from flooring panels 122, but may have a second level of strength when coupled with the fuselage which may be higher than the first level of strength.

In various embodiments the cargo floor members may be referred to as "core" or "sandwich" structural panels. Such core panels may include two spaced-apart surface panels, and multiple transverse members arranged in various patterns sandwiched between the surface panels or face panels or face sheets. The surface panels may be substantially parallel. The various cross sectional patterns of the transverse members may include, but may not be limited to a honeycomb pattern, a zigzag pattern, corrugated pattern or the like. Returning to FIG. 1 B, two substantially parallel surface panels 130 and 132 are easily viewed in this magnified illustration. In various embodiments the body of the aircraft fuselage 16 may be similarly constructed from core. FIG. 3 is a cross-sectional view of the flooring panel 122 taken at the line 3-3 in FIG. 2 illustrating one example without limitation of an arrangement of transverse members 130 in a core flooring panel 122 in a honeycomb pattern. FIG. 4 is a cross-sectional view of the aircraft fuselage 116 taken at the line 4-4 in FIG. 2 illustrating one example without limitation of an arrangement of transverse members 132 in aircraft fuselage 116 in a honeycomb pattern.

Various embodiments may include features to move, manage, and/or secure cargo. For example, as may be best illustrated in FIG. 1B, the longitudinal member 20 may include a channel 40 therein adapted to receive a roller 42 adapted to roll along and in the channel 40. The roller 42 may be coupled to a unit load device 44, (only a portion of which is illustrated) such that the unit load device 44 is movable along the aircraft fuselage 16. FIG. 5 illustrates a cross-sectional view of an aircraft fuselage and cargo floor system including cargo containers in accordance with various example embodiments wherein containers 45 serve as the unit load devices 44 that may be loaded up with cargo.

The longitudinal members 20 may be encased or embedded in an encasement 21 (shown in FIG. 1B) that can be made from and/or include various materials. For example, they may be embedded in a thermoplastic. In various embodiments the thermoplastic may be attached to the fuselage with a bonding agent.

The longitudinal members themselves may be made from and/or include a material suitable for contacting and/or coupling with a roller or other securing member. The longitudinal member 20 itself or the encasement 21 (as illustrated) may include a central raised portion 50 with the channel 40 being in the central raised portion 50 open to an interior of the aircraft fuselage and adapted to receive the roller 40 or a securing member (not shown), such as the end of a strut, to secure cargo. The longitudinal member 20 itself or the encasement 21 may also include a protruding flange 52 below and on opposite sides of the central raised portion 50 adapted to support the flooring panels 22.

FIG. 6 illustrates a partial cross-sectional view of a cargo floor disposed in an aircraft fuselage 216 in accordance with various embodiments. An aircraft cargo floor or system 210 may include flooring panels 222 that are disposed substantially between the longitudinal members 220 and are substantially supported by a substantially flat bottom 214 of the fuselage. The flooring panels 222 may be made from core panels which have spaced apart surface panels 230, 232 wherein one panel 232 is formed as an arch. Various configurations are possible in accordance with various embodiments.

FIGS. 7 and 8 illustrate partial cross-sectional views in accordance with various embodiments wherein a plurality of discrete support members 360 (only one is illustrated) may be coupled to the inner bottom 314 and adapted to support one or more floor panels 322. Each discrete support member 360 may include a rod 361 that may be threaded, and may be coupled with an attachment structure 363 that may have a bottom hollow portion 362 open to a top surface 315 of the inner bottom 314 and adapted to be brought to a negative pressure to create a suction and adapted to be attached to the inner bottom 314 via the suction. The suction may be effected by an actuating means (not shown), or the attachment structure 363 may be a resilient suction cup. An adhesive 364 may be applied inside the bottom hollow 362 to adhere the discrete support members 360 to the inner bottom 314. Embodiments may include multiple flooring panels 322 and may appear as illustrated in FIG. 7. The flooring panels 322 may be supported on a sleeve 366 that may be disposed around the rod 361. Various other embodiments may include a unitary flooring panel 322' which may be constructed as is partially illustrated in FIG. 8.

FIG. 9 is a flow diagram illustrating a method 500 in accordance with various embodiments. The method 500 may include:
providing a pressurizable aircraft fuselage with a substantially flat inner bottom to raise the aircraft fuselage's structural strength, 502; coupling longitudinal members with the substantially flat inner bottom, 504; and further coupling structural floor panels to the longitudinal members, 506.

Figure 10:
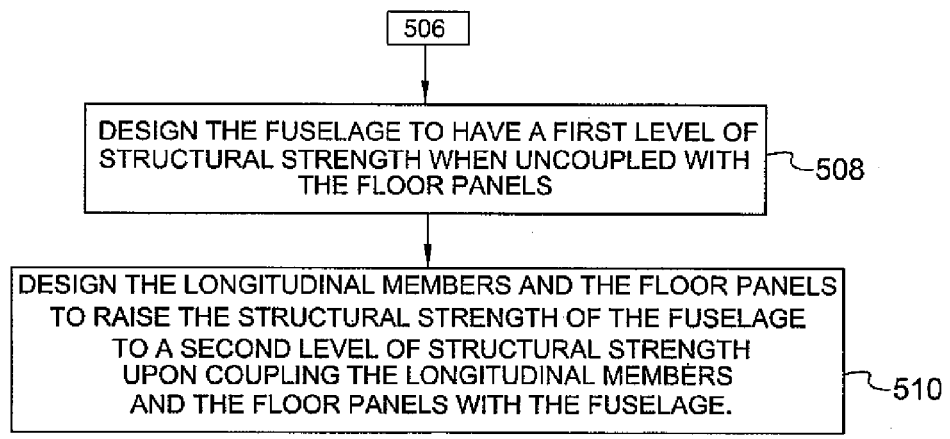
FIG. 10 is a flow diagram illustrating a method in accordance with various embodiments.

FIG. 10 is a flow diagram illustrating a method in accordance with various embodiments. Such embodiments may include portions similar to the embodiments illustrated in FIG. 9, and may further include: designing the fuselage to have a first level of structural strength when uncoupled with the floor panels, 508, and designing the longitudinal members and the floor panels to raise the structural strength of the fuselage to a second level of structural strength upon coupling the longitudinal members and the floor panels with the fuselage, 510.

Figure 11:
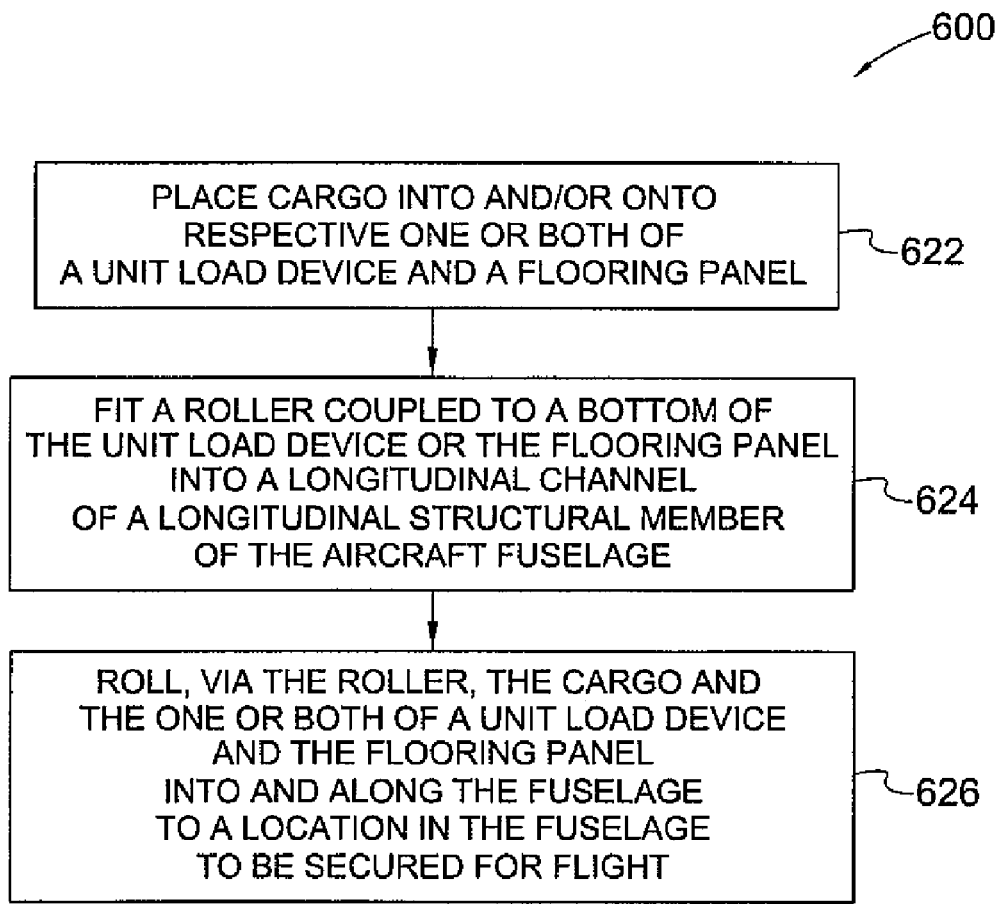
FIG. 11 is a flow diagram illustrating a method in accordance with various embodiments.

FIG. 11 is a flow diagram illustrating a method 600 of loading cargo into an aircraft fuselage in accordance with various embodiments. The method 600 may include:
placing cargo into and/or onto respective one or both of a unit load device and a flooring panel, 622;
fitting a roller coupled to a bottom of the unit load device or the flooring panel into a longitudinal channel of a longitudinal structural member of the aircraft fuselage, 624; and
rolling, via the roller, the cargo and the one or both of a unit load device and the flooring panel into and along the fuselage to a location in the fuselage to be secured for flight, 626.

In various embodiments the longitudinal structural member may provide some additional in-flight strength to the aircraft.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A method comprising the steps of:
providing a pressurizable aircraft fuselage with a substantially flat inner bottom to raise the aircraft fuselage structural strength;
coupling longitudinal members with the substantially flat inner bottom;
orienting the longitudinal members substantially longitudinally along the fuselage;
forming at least one flooring panel as a core panel having a pair of spaced apart surface panels, the surface panel nearest the inner bottom being formed as an arch; and
coupling the core panel to the longitudinal members.

2. The method of claim 1 further comprising the steps of:
designing the fuselage to have a first level of structural strength when uncoupled with the floor panels; and
designing the longitudinal members and the floor panels to raise the structural strength of the fuselage to a second level of structural strength upon coupling the longitudinal members and the floor panels with the fuselage.

3. The method of claim 1 wherein the step of coupling the longitudinal members with the flat inner bottom comprises bonding the longitudinal members to the flat inner bottom.

4. The method of claim 1 wherein the step of coupling the longitudinal members with the flat inner bottom comprises integrally forming the longitudinal members with the flat inner bottom.

5. The method of claim 1 wherein at least one of the longitudinal members includes a channel.

6. The method of claim 5 wherein the longitudinal member includes a central raised portion having the channel disposed therewithin.

7. The method of claim 1 further comprising the step of encasing at least one of the longitudinal members in an encasement.

8. The method of claim 7 further comprising the step of bonding the encasement to the flat inner bottom.

9. The method of claim 1 wherein the core panel includes:
a plurality of transverse members sandwiched between the surface panels.

10. A method, comprising:
providing a pressurizable aircraft fuselage with a substantially flat inner bottom to raise the aircraft fuselage structural strength;
coupling longitudinal members with the substantially flat inner bottom;
coupling structural floor panels to the longitudinal members;
forming at least one of the floor panels as a core panel having a pair of spaced apart surface panels;
forming at least one of the surface panels as an arch; and
inserting a plurality of transverse members between the surface panels.

11. A method of forming a cargo floor, comprising the steps of:
providing an aircraft fuselage with a substantially flat fuselage bottom inner skin;
coupling a plurality of support members to the fuselage bottom inner skin, each one of the support members comprising a rod extending through a sleeve disposed around the rod;
mounting an attachment structure to the bottom skin, the attachment structure extending laterally beyond an outer edge of the sleeve; and
supporting a plurality of floor panels on the sleeves of the support members, each one of the rods being coupled to the attachment structure and extending upwardly from the attachment structure to the floor panel.

12. The method of claim 11 wherein the floor panel is formed as a core panel comprising:
a pair of spaced apart surface panels; and
a plurality of transverse members sandwiched between the surface panels.

13. The method of claim 12 wherein the transverse members are formed in one of a honeycomb pattern, a zigzag pattern, and a corrugated pattern.

14. The method of claim 11 wherein the step of coupling the support members to the fuselage bottom inner skin comprises bonding the support members to the fuselage bottom inner skin.

15. The method of claim 11 wherein the rod of at least one of the support members comprises a threaded rod.

16. A method of forming a cargo floor of an aircraft, comprising the steps of:
providing a pressurizable aircraft fuselage with a substantially flat inner bottom;
providing a plurality of longitudinal members to the substantially flat inner bottom, each one of the longitudinal members being encased within an encasement formed of thermoplastic;
bonding the encasement to the flat inner bottom; and
coupling a plurality of structural floor panels to the longitudinal members, each one of the floor panels including:
a pair of spaced apart surface panels, one of the surface panels being formed as an arch; and
a plurality of transverse members sandwiched between the surface panels, the transverse being formed in one of a honeycomb pattern, a zigzag pattern, and a corrugated pattern.

* * * * *